(12) United States Patent
Morin et al.

(10) Patent No.: US 10,526,914 B2
(45) Date of Patent: Jan. 7, 2020

(54) GAS TURBINE ENGINE WITH LOW FAN NOISE

(71) Applicant: UNITED TECHNOLOGIES CORPORATION, Farmington, CT (US)

(72) Inventors: Bruce L. Morin, Springfield, MA (US); Wesley K. Lord, South Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 452 days.

(21) Appl. No.: 14/761,689

(22) PCT Filed: Mar. 11, 2014

(86) PCT No.: PCT/US2014/023392
§ 371 (c)(1),
(2) Date: Jul. 17, 2015

(87) PCT Pub. No.: WO2014/150489
PCT Pub. Date: Sep. 25, 2014

(65) Prior Publication Data
US 2015/0361824 A1  Dec. 17, 2015

Related U.S. Application Data

(60) Provisional application No. 61/789,006, filed on Mar. 15, 2013.

(51) Int. Cl.
*F01D 25/04* (2006.01)
*F01D 5/02* (2006.01)
(Continued)

(52) U.S. Cl.
CPC ............... *F01D 25/04* (2013.01); *F01D 5/02* (2013.01); *F01D 5/141* (2013.01); *F01D 9/02* (2013.01);
(Continued)

(58) Field of Classification Search
CPC . F01D 25/04; F01D 17/14; F01D 9/02; F01D 5/02; F01D 5/14; F01D 5/141; F05D 2220/36; F05D 2260/96
See application file for complete search history.

(56) References Cited

U.S. PATENT DOCUMENTS

| | | | | |
|---|---|---|---|---|
| 3,598,318 A | * | 8/1971 | Schiel | F02K 1/06 239/265.13 |
| 3,610,262 A | * | 10/1971 | Wise | F02C 7/045 137/15.1 |

(Continued)

OTHER PUBLICATIONS

14 CFR 36, Noise Standards: Aircraft Type and Airworthiness Certification, 2011.*

(Continued)

*Primary Examiner* — Patrick D Maines
(74) *Attorney, Agent, or Firm* — Cantor Colburn LLP

(57) ABSTRACT

In accordance with one aspect of the disclosure, a gas turbine engine, method of using and designing such is disclosed. The gas turbine engine may comprise a fan including a plurality of blades, and a variable area fan nozzle. The fan may be configured to have a design point fan tip leading edge relative flow angle $\beta_{ADP}$, and may be further configured to have an off-design point fan tip leading edge relative flow angle $\beta$ at an off-design fan operating point. The variable area fan nozzle may be configured to manipulate the amount of air flowing through the fan so that the absolute value of a difference between the design point fan tip leading edge relative flow angle $\beta_{ADP}$ and the off-design (Continued)

point fan tip leading edge relative flow angle β is in a specified range.

20 Claims, 4 Drawing Sheets

(51) Int. Cl.
  *F01D 5/14* (2006.01)
  *F01D 9/02* (2006.01)
  *F02K 1/15* (2006.01)
  *F02K 1/16* (2006.01)
  *F01D 17/14* (2006.01)

(52) U.S. Cl.
  CPC ............... *F01D 17/14* (2013.01); *F02K 1/15* (2013.01); *F02K 1/16* (2013.01); *F05D 2220/36* (2013.01); *F05D 2260/96* (2013.01)

(56) References Cited

U.S. PATENT DOCUMENTS

| | | | |
|---|---|---|---|
| 3,873,229 | A | 3/1975 | Mikolajczak et al. |
| 5,169,288 | A | 12/1992 | Gliebe et al. |
| 5,315,821 | A | 5/1994 | Dunbar et al. |
| 5,794,432 | A | 8/1998 | Dunbar et al. |
| 6,554,564 | B1 * | 4/2003 | Lord ............... F01D 5/141 415/119 |
| 8,800,261 | B2 * | 8/2014 | Hall ............... F02K 1/09 60/204 |
| 8,820,088 | B2 * | 9/2014 | Gilson ............... F02K 1/09 181/215 |
| 2005/0103933 | A1 | 5/2005 | Lair |
| 2007/0217915 | A1 * | 9/2007 | Fujimura ............... F01D 5/3015 416/219 R |
| 2008/0001039 | A1 * | 1/2008 | Winter ............... F01D 17/141 244/53 R |
| 2009/0053058 | A1 * | 2/2009 | Kohlenberg ............... B64D 33/04 415/227 |
| 2009/0277155 | A1 * | 11/2009 | Bulin ............... B64C 7/02 60/226.3 |
| 2010/0043394 | A1 * | 2/2010 | Pero ............... F01D 17/14 60/226.3 |
| 2010/0044503 | A1 * | 2/2010 | Bulin ............... F02K 1/09 244/54 |
| 2010/0229528 | A1 * | 9/2010 | Ramlaoui ............... F02K 1/09 60/226.2 |
| 2012/0011825 | A1 * | 1/2012 | Hall ............... F02K 1/09 60/204 |

OTHER PUBLICATIONS

AC36-4D, Noise Standards: Aircraft Type and Airworthiness Certification, 2017.*
International Search Report for related International Application No. PCT/US14/023392; report dated Jul. 17, 2014.
European Search Report for Applicaiton No. EP14770159.

* cited by examiner

GAS TURBINE ENGINE WITH LOW FAN NOISE

CROSS-REFERENCE TO RELATED APPLICATION

This Application is a US National Stage under 35 USC § 371 of International Patent Application No. PCT/US14/23392 filed on Mar. 11, 2014, and claims priority under 35 USC § 119(e) to U.S. Provisional Patent Application Ser. No. 61/789,006 filed on Mar. 15, 2013.

STATEMENT REGARDING FEDERALLY SPONSORED RESEARCH AND DEVELOPMENT

This invention was made in part with Government support under Contract Number NAS3-01138, Task 1 and awarded by NASA. The Government may have certain rights in this invention.

TECHNICAL FIELD

This disclosure relates to the design of a gas turbine engine with reduced fan noise.

BACKGROUND

Gas turbine engines are known, and typically include a fan delivering air into a bypass duct, and into a compressor. The air in the compressor is compressed and passed into a combustion section where it is mixed with fuel and ignited. Products of this combustion pass downstream over turbine rotors, driving them to rotate. The turbine rotors in turn drive the fan and compressor rotors.

Gas turbine engines having a fan as described above are typically utilized to drive aircraft. This fan can be a significant contributor to the noise produced by the aircraft; therefore, quiet fan operation is desired to reduce aircraft noise.

SUMMARY OF THE DISCLOSURE

In accordance with one aspect of the disclosure, a gas turbine engine is disclosed. The gas turbine engine may comprise a fan and a variable area fan nozzle. The fan includes a plurality of blades, each blade having a leading edge. The fan may be configured to have a design point fan tip leading edge relative flow angle $\beta_{ADP}$, and may be further configured to have an off-design point fan tip leading edge relative flow angle $\beta$ at an off-design fan operating point. The off-design fan operating point may be an acoustic certification point defined by Part 36 of the Federal Airworthiness Regulations. The acoustic certification point may be selected from the group consisting of approach, flyover and lateral. The variable area fan nozzle may be configured to manipulate the amount of air flowing through the fan so that the absolute value of a difference between the design point fan tip leading edge relative flow angle $\beta_{ADP}$ and the off-design point fan tip leading edge relative flow angle $\beta$ is in the range of about zero degrees to about six degrees. The design point fan tip leading edge relative flow angle $\beta_{ADP}$ may be defined by the solution to the following set of simultaneous equations $$W_{C,ADP}/A = 85.38 M_{ADP}/(1 + 0.2 M_{ADP}^2)^3$$

and $$\beta_{ADP} = \tan^{-1}\left(\frac{49.02 M_{ADP}\sqrt{518.67/(1 + 0.2 M_{ADP}^2)}}{U_{C,ADP}}\right)$$

wherein the off-design point tip relative flow angle $\beta$ may be defined by the solution to the following set of simultaneous equations $$W_C/A = 85.38 M/(1 + 0.2 M^2)^3$$

and $$\beta = \tan^{-1}\left(\frac{49.02 M\sqrt{518.67/(1 + 0.2 M^2)}}{U_C}\right)$$

wherein ($W_{C,ADP}/A$) is the design point corrected mass flow rate per unit area in pounds mass per second per square foot, ($U_{C,ADP}$) is the design point corrected tip speed in feet per second, $M_{ADP}$ is the design point airflow Mach number, $\beta_{ADP}$ is in degrees, ($W_C/A$) is the corrected mass flow rate per unit area in pounds mass per second per square foot, $U_C$ is the corrected tip speed in feet per second, M is the airflow Mach number, and $\beta$ is in degrees.

In a refinement, the absolute value of the difference between the design point fan tip leading edge relative flow angle $\beta_{ADP}$ and the off-design point fan tip leading edge relative flow angle $\beta$ is in the range of about zero degrees to about five degrees. In a different refinement, the absolute value of the difference between the design point fan tip leading edge relative flow angle $\beta_{ADP}$ and the off-design point fan tip leading edge relative flow angle $\beta$ may be in the range of about zero degrees to about four degrees. In a different refinement the range may be about zero degrees to about three degrees.

In some embodiments, the design point fan pressure ratio may not exceed about 1.45 and the design point corrected tip speed ($U_{C,ADP}$) may not exceed about 1150 feet per second. In some such embodiments, the absolute value of the difference between the design point fan tip leading edge relative flow angle $\beta_{ADP}$ and the off-design point fan tip leading edge relative flow angle $\beta$ may be in the range of about zero degrees to about five degrees. In other such embodiments, the absolute value of the difference between the design point fan tip leading edge relative flow angle $\beta_{ADP}$ and the off-design point fan tip leading edge relative flow angle $\beta$ is in the range of about zero degrees to about four degrees. In other such embodiments, the absolute value of the difference between the design point fan tip leading edge relative flow angle $\beta_{ADP}$ and the off-design point fan tip leading edge relative flow angle $\beta$ is in the range of about zero degrees to about three degrees.

In a refinement, the gas turbine may be a geared turbofan engine. In a further refinement, the absolute value of the difference between the design point fan tip leading edge relative flow angle $\beta_{ADP}$ and the off-design point fan tip leading edge relative flow angle $\beta$ may be in the range of about zero degrees to about five degrees. In a different refinement, the absolute value of the difference between the design point fan tip leading edge relative flow angle $\beta_{ADP}$ and the off-design point fan tip leading edge relative flow angle $\beta$ may be in the range of about zero degrees to about four degrees. In yet another refinement, the absolute value of the difference between the design point fan tip leading edge relative flow angle $\beta_{ADP}$ and the off-design point fan tip leading edge relative flow angle $\beta$ is in the range of about zero degrees to about three degrees.

In accordance with another aspect of the disclosure, a method of using a gas turbine propulsion system is disclosed. The method may comprise operating a gas turbine engine including a fan and a variable area fan nozzle. The fan may include a plurality of blades each having a leading edge. The fan may be configured to have a design point fan tip leading edge relative flow angle $\beta_{ADP}$, and may be further configured to have an off-design point fan tip leading edge relative flow angle $\beta$ at an off-design fan operating point. The off-design fan operating point may be an acoustic certification point defined by Part 36 of the Federal Airworthiness Regulations. The acoustic certification point may be selected from the group consisting of approach, flyover and lateral. The method may further include using the variable area fan nozzle to manipulate the amount of air flowing through the fan so that the absolute value of a difference between the design point fan tip leading edge relative flow angle $\beta_{ADP}$ and the off-design point fan tip leading edge relative flow angle $\beta$ is in the range of about zero degrees to about six degrees, wherein the design point fan tip leading edge relative flow angle $\beta_{ADP}$ is defined by the solution to the following set of simultaneous equations $$W_{C,ADP}/A = 85.38 M_{ADP}/(1 + 0.2 M_{ADP}^2)^3$$

and $$\beta_{ADP} = \tan^{-1}\left(\frac{49.02 M_{ADP}\sqrt{518.67/(1 + 0.2 M_{ADP}^2)}}{U_{C,ADP}}\right)$$

wherein further the off-design point tip relative flow angle $\beta$ is defined by the solution to the following set of simultaneous equations $$W_C/A = 85.38 M/(1 + 0.2 M^2)^3$$

and $$\beta = \tan^{-1}\left(\frac{49.02 M \sqrt{518.67/(1 + 0.2 M^2)}}{U_C}\right)$$

wherein ($W_{C,ADP}/A$) is the design point corrected mass flow rate per unit area in pounds mass per second per square foot, ($U_{C,ADP}$) is the design point corrected tip speed in feet per second, $M_{ADP}$ is the design point airflow Mach number, $\beta_{ADP}$ is in degrees, ($W_C/A$) is the corrected mass flow rate per unit area in pounds mass per second per square foot, $U_C$ is the corrected tip speed in feet per second, M is the airflow Mach number, and $\beta$ is in degrees.

In a further refinement, the absolute value of the difference between the design point fan tip leading edge relative flow angle $\beta_{ADP}$ and the off-design point fan tip leading edge relative flow angle $\beta$ may be in the range of about zero degrees to about five degrees. In an alternative further refinement, the absolute value of the difference between the design point fan tip leading edge relative flow angle $\beta_{ADP}$ and the off-design point fan tip leading edge relative flow angle $\beta$ may be in the range of about zero degrees to about four degrees. In a further alternative refinement, the absolute value of the difference between the design point fan tip leading edge relative flow angle $\beta$ and the off-design point fan tip leading edge relative flow angle 1 may be in the range of about zero degrees to about three degrees.

In accordance with one aspect of the disclosure, a gas turbine engine is disclosed. The gas turbine engine may comprise a fan and a variable area fan nozzle. The fan includes a plurality of blades, each blade having a leading edge. The fan may be configured to have a design point fan tip leading edge relative flow angle $\beta_{ADP}$, and may be further configured to have an off-design point fan tip leading edge relative flow angle $\beta$ at an off-design fan operating point. The off-design fan operating point may be an acoustic operating point. The variable area fan nozzle may be configured to manipulate the amount of air flowing through the fan so that the absolute value of a difference between the design point fan tip leading edge relative flow angle $\beta_{ADP}$ and the off-design point fan tip leading edge relative flow angle $\beta$ is less than about five degrees. The design point fan tip leading edge relative flow angle $\beta_{ADP}$ may be defined by the solution to the following set of simultaneous equations $$W_{C,ADP}/A = 85.38 M_{ADP}/(1 + 0.2 M_{ADP}^2)^3$$

and $$\beta_{ADP} = \tan^{-1}\left(\frac{49.02 M_{ADP}\sqrt{518.67/(1 + 0.2 M_{ADP}^2)}}{U_{C,ADP}}\right)$$

wherein the off-design point tip relative flow angle $\beta$ may be defined by the solution to the following set of simultaneous equations $$W_C/A = 85.38 M/(1 + 0.2 M^2)^3$$

and $$\beta = \tan^{-1}\left(\frac{49.02 M \sqrt{518.67/(1 + 0.2 M^2)}}{U_C}\right)$$

wherein ($W_{C,ADP}/A$) is the design point corrected mass flow rate per unit area in pounds mass per second per square foot, ($U_{C,ADP}$) is the design point corrected tip speed in feet per second, $M_{ADP}$ is the design point airflow Mach number, $\beta_{ADP}$ is in degrees, ($W_C/A$) is the corrected mass flow rate per unit area in pounds mass per second per square foot, $U_C$ is the corrected tip speed in feet per second, M is the airflow Mach number, and $\beta$ is in degrees.

In a refinement, the absolute value of the difference between the design point fan tip leading edge relative flow angle $\beta_{ADP}$ and the off-design point fan tip leading edge relative flow angle $\beta$ is less than four degrees at all acoustic operating points. In a refinement the gas turbine engine may be a geared turbofan engine. In some embodiments, the design point fan pressure ratio may not exceed about 1.45 and the design point corrected tip speed ($U_{C,ADP}$) may not exceed about 1150 feet per second.

DETAILED DESCRIPTION

Figure 1:
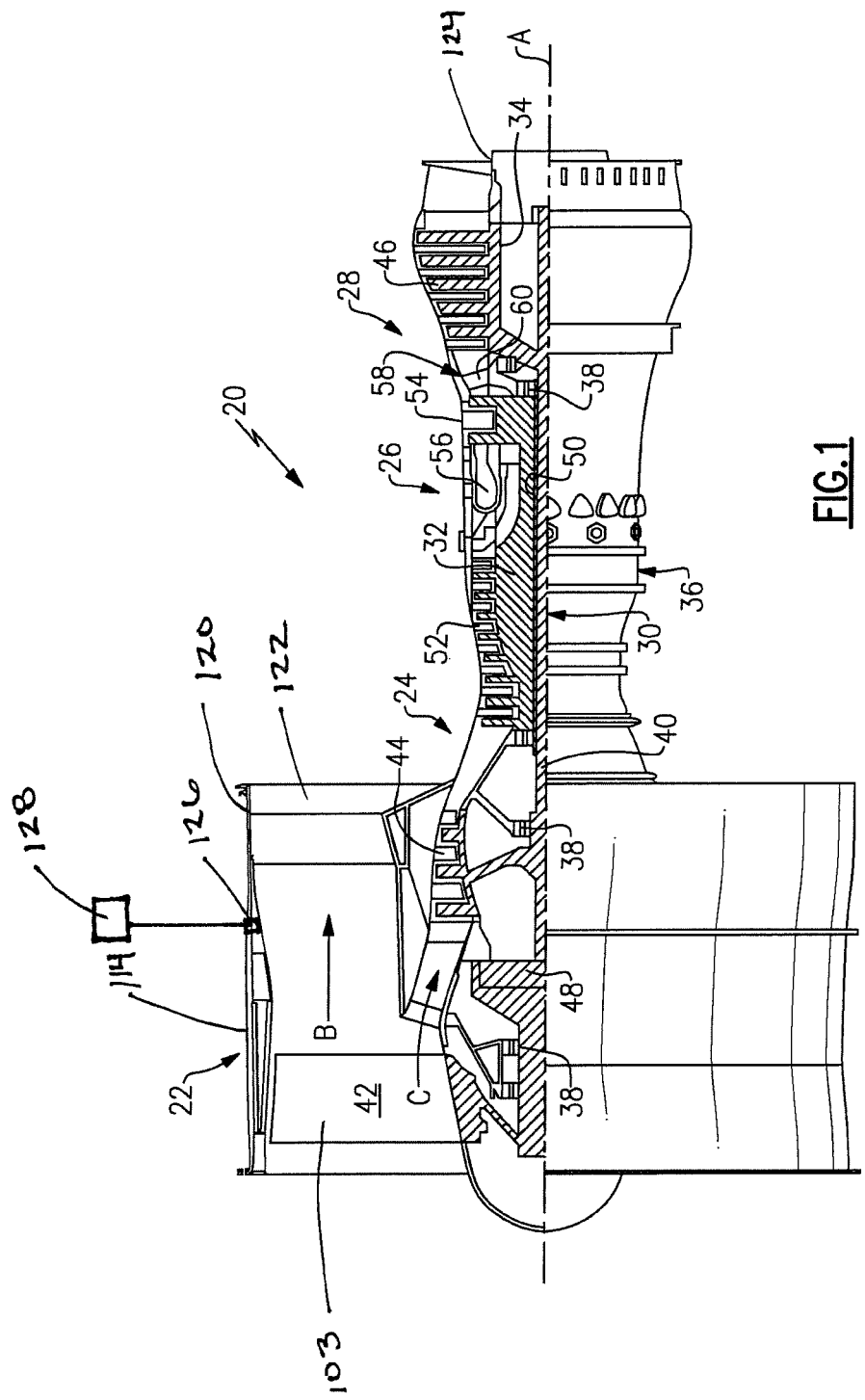
FIG. 1 illustrates selected portions of an exemplary gas turbine propulsion system including a gas turbine engine having a variable fan nozzle.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The fan has a plurality of blades 103. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

A nozzle 120 is associated with the bypass flow path B. In one embodiment, the nozzle 120 may be coupled with a trailing edge of the nacelle 114. The nozzle 120 may be a variable area fan nozzle. The nozzle 120 may include actuators 126 for movement between a plurality of positions to influence the amount of air flowing through the fan 42. A controller 128 may command the actuators 126 to selectively move the nozzle 120 among the plurality of positions to manipulate amount of air flowing through the fan 42 by changing an effective flow area (e.g., a cross-sectional area) of the nozzle 120. This changes the velocity of the air flowing through the fan 42 and the relative flow angle $\beta$ at the fan blade 103.

The controller 128 may be dedicated to controlling the actuators 126 and nozzle 120, integrated into an existing engine controller within the gas turbine engine 20, or be incorporated with other known aircraft or engine controls.

In operation, the fan 42 drives air into the gas turbine engine 20 core flow path C and into the bypass flow path B. In one embodiment, approximately 80 percent of the airflow entering the nacelle 114 flows along the bypass flow path B. The bypass air flow is discharged from the gas turbine engine 20 through a rear exhaust outlet 122. The core air flow is discharged from a passage disposed adjacent to a tail cone 124.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades 103. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

The use of the gear reduction between the low speed spool 30 and the fan 42 allows an increase of speed to the low pressure compressor 44. In the past, the speed of the low pressure turbine 46 and the low pressure compressor 44 has been somewhat limited in that the fan speed cannot be unduly large. The maximum fan speed is at its outer tip, and in larger engines, the fan diameter is much larger than it may be in smaller power engines. However, the use of the gear reduction has freed the designer from limitation on the speeds of the low pressure turbine 46 and the low pressure compressor 44 speeds caused partially by a desire to not have unduly high fan speeds.

Figure 2:
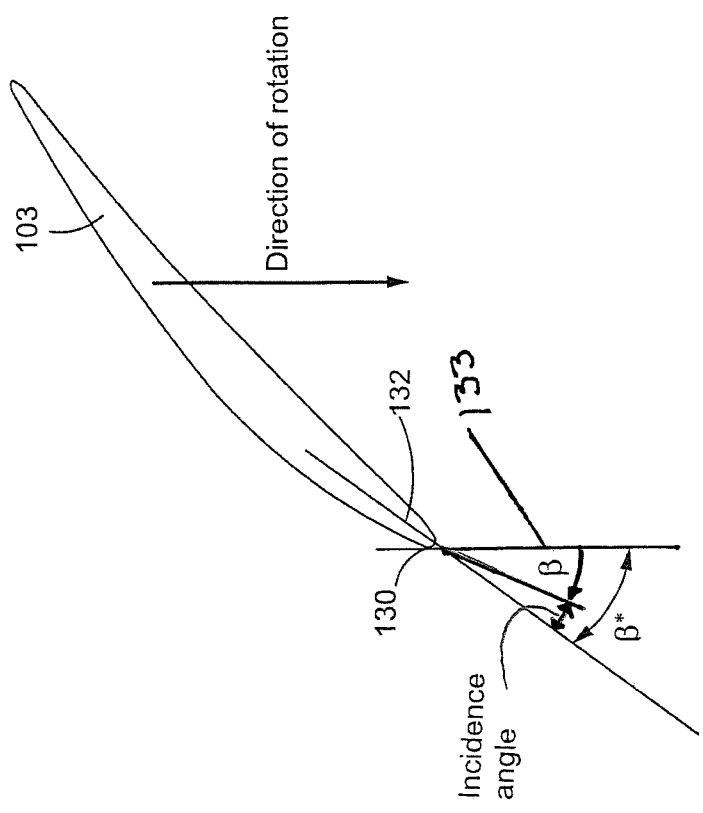
FIG. 2 illustrates an exemplary fan blade in accordance with the teachings of this disclosure.

FIG. 2 illustrates an exemplary fan blade 103. As is known in the art, each blade 103 has a fan tip leading edge 130. The blade leading edge metal angle is denoted by the symbol β*. The blade leading edge metal angle β* is the angle that the camber liner 132 at the leading edge 130 forms with the tangential direction 133.

Figure 3:
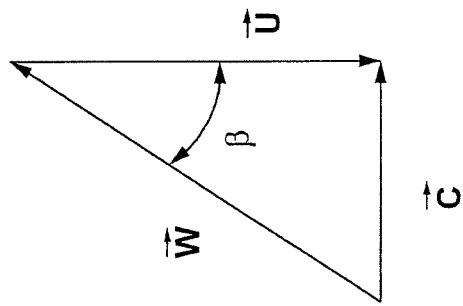
FIG. 3 illustrates an exemplary airflow velocity triangle at the fan tip leading edge.

FIG. 3 illustrates a typical airflow velocity triangle, as is known in the art, at the fan tip leading edge 130. The $\vec{C}$ and $\vec{W}$ vectors denote the airflow velocity in the stationary and rotating frames of reference, respectively, and the $\vec{U}$ vector denotes the tip velocity of the fan 42. The $\vec{C}$ vector is the sum of the $\vec{W}$ and $\vec{U}$ vectors. The symbol β denotes the relative flow angle at the fan tip leading edge 130, which is the angle between the $\vec{W}$ and $\vec{U}$ vectors.

The difference between β* and β is the incidence angle. Fan noise is strongly correlated to the fan blade 103 leading edge 130 incidence angle. The fan 42 is typically designed for a particular flight condition or aerodynamic design point. An example of such a design point is cruise at about 0.8 Mach and about 35,000 feet. At a given design point, there is a relative flow angle $\beta_{ADP}$ at the fan tip leading edge 130 and a leading edge incidence angle (the difference between β* and $\beta_{ADP}$.) The subscript ADP stands for aerodynamic design point.

Figure 4:
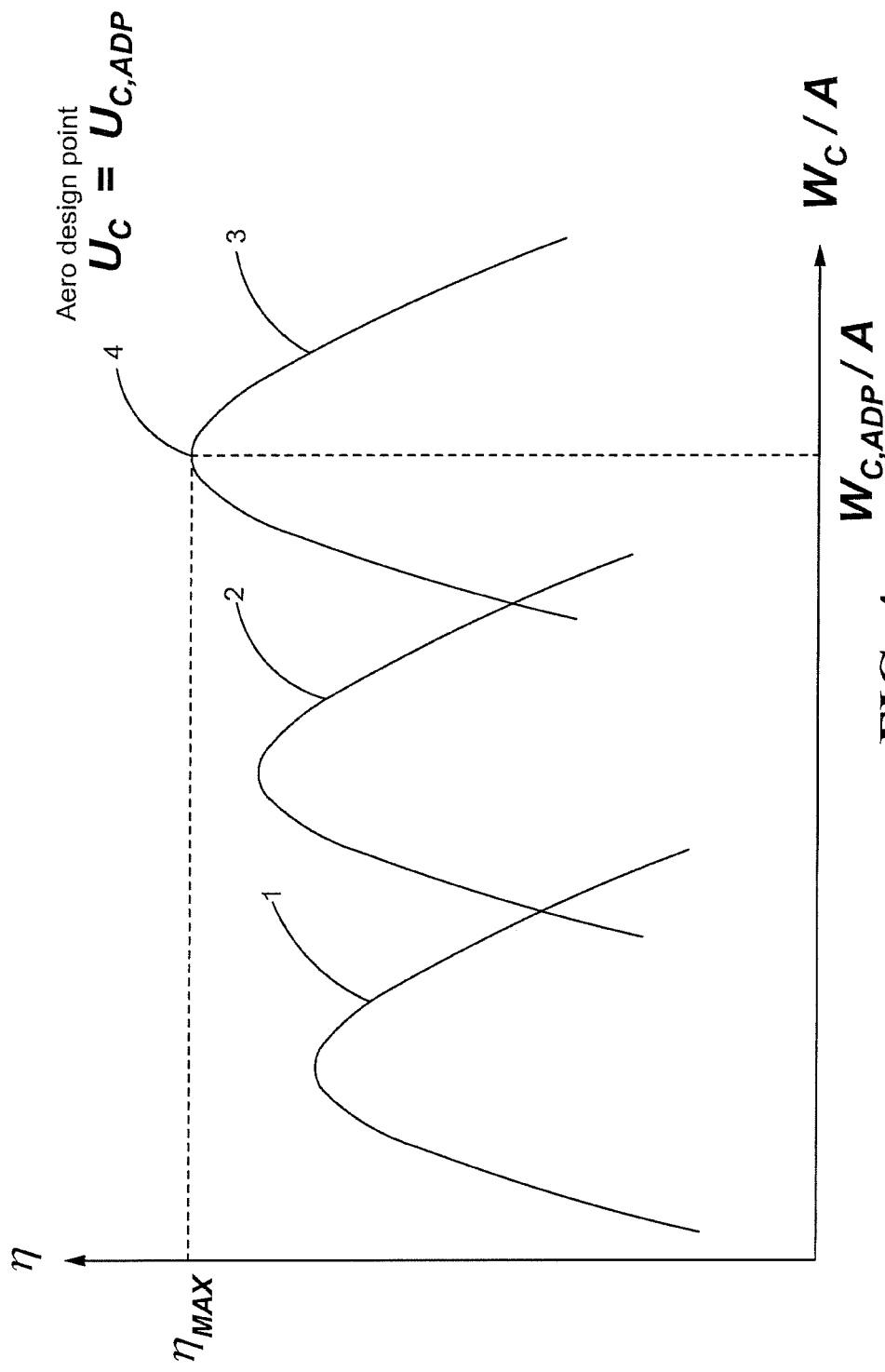
FIG. 4 illustrates a fan efficiency map.

FIG. 4 illustrates a fan efficiency map with efficiency (η) plotted versus corrected mass flow rate per unit area ($W_C/A$) for three corrected fan tip speeds ($U_C$) denoted by curves 1, 2 and 3.

The equation below defines the corrected mass flow rate per unit area ($W_C/A$) in terms of mass flow rate per unit area (W/A), total pressure ($P_T$) and temperature ($T_T$) of the airflow entering the fan 42, and a reference pressure ($P_{REF}$) and temperature ($T_{REF}$), which are taken to be 2116.22 pounds per square foot and 518.67 degrees Rankine, respectively.

$$W_C/A = \frac{(W/A)\sqrt{T_T/T_{REF}}}{P_T/P_{REF}}$$

The equation below defines the corrected fan tip speed ($U_C$) in terms of fan tip speed (U), temperature ($T_T$) of the airflow entering the fan 42, and a reference temperature ($T_{REF}$), which is taken to be 518.67 degrees Rankine.

$$U_C = \frac{U}{\sqrt{T_T/T_{REF}}}$$

As illustrated in FIG. 1, the efficiency reaches its maximum value ($\eta_{MAX}$) at a unique point corresponding to the aerodynamic design point. At that point, the corrected flow rate per unit area and corrected tip speed are denoted by ($W_{C,ADP}/A$) and ($U_{C,ADP}$), respectively. (The subscript ADP stands for aerodynamic design point.)

At the aerodynamic design point, the incidence angle is at its optimum value and the efficiency is at its maximum value. At other operating points, the incidence angle is not optimal, which decreases efficiency and increases noise. To reduce noise at acoustic operating points, for example, landing and takeoff, it is desirable to have the incidence angle near its optimum value. This can be achieved by controlling the relative flow angle β, the blade leading edge metal angle β* or a combination of both.

It has been discovered that fan 42 noise may be reduced by keeping the incidence angle within about six (6) degrees or less of the incidence angle at the aerodynamic design point. This is achieved by maintaining a specified relationship between the corrected mass flow per unit area ($W_C/A$) and the corrected fan tip speed ($U_C$).

The following analysis describes a method for controlling the relative flow angle β at the fan tip leading edge 130, and ensuring that it does not deviate from the design point relative flow angle $\beta_{ADP}$ (at the fan tip leading edge 130) by more than a specified amount. This analysis is particularly relevant to gas turbine engines that have means to control the fan operating line (e.g. with a variable area fan nozzle). The fan tip leading edge 130 relative flow angle β, when not at the aerodynamic design point, is considered to be an off-design point fan tip leading edge relative flow angle β at an off-design fan operating point. The off-design fan operating point may be an acoustic certification point defined by Part 36 of the Federal Airworthiness Regulations. Such acoustic certification point may include, but is not limited to, approach, flyover, or lateral. By applying the teachings of this disclosure, one can reduce noise by maintaining near-optimal incidence at the acoustic operating points.

To facilitate the analysis, the $\vec{C}$ vector is assumed to be spatially uniform and parallel to the axis of rotation, and the airflow is assumed to be a perfect gas with its gas constant equal to 53.35 (ft-lbf)/(lbm-R) and its specific heat ratio equal to 1.4. However, these assumptions are not required, and more general relationships could be derived.

Under these assumptions, one can determine the relative flow angle $\beta_{ADP}$ (at the fan tip leading edge 130) for an aerodynamic design point by solving the following set of simultaneous equations, wherein ($W_{C,ADP}/A$) is the known design point corrected mass flow rate per unit area in pounds mass per second per square foot, ($U_{C,ADP}$) is the known design-point corrected tip speed in feet per second, $M_{ADP}$ is the design-point airflow Mach number, and $\beta_{ADP}$ is the design point tip relative flow angle in degrees, $$W_{C,ADP}/A = 85.38 M_{ADP}/(1 + 0.2 M_{ADP}^2)^3$$

$$\beta_{ADP} = \tan^{-1}\left(\frac{49.02 M_{ADP}\sqrt{518.67/(1 + 0.2 M_{ADP}^2)}}{U_{C,ADP}}\right)$$

Furthermore, by solving the next set of simultaneous equations, one can then determine the relationship between ($W_C/A$) and $U_C$ that will ensure that $\beta$ does not deviate from $\beta_{ADP}$ by more than a desired small value. In those equations, $\delta$ is the known desired small value in degrees, $\beta_{ADP}$ is the known design point tip relative flow angle in degrees, $\beta$ is the tip relative flow angle in degrees, $U_C$ is the corrected tip speed in feet per second, M is the airflow Mach number, and ($W_C/A$) is the corrected mass flow rate per unit area in pounds mass per second per square foot.

$$|\beta - \beta_{ADP}| \leq \delta$$

$$U_C = \frac{49.02 M \sqrt{518.67/(1 + 0.2 M^2)}}{\tan(\beta)}$$

$$W_C/A = 85.38 M/(1 + 0.2 M^2)^3$$

Figure 5:
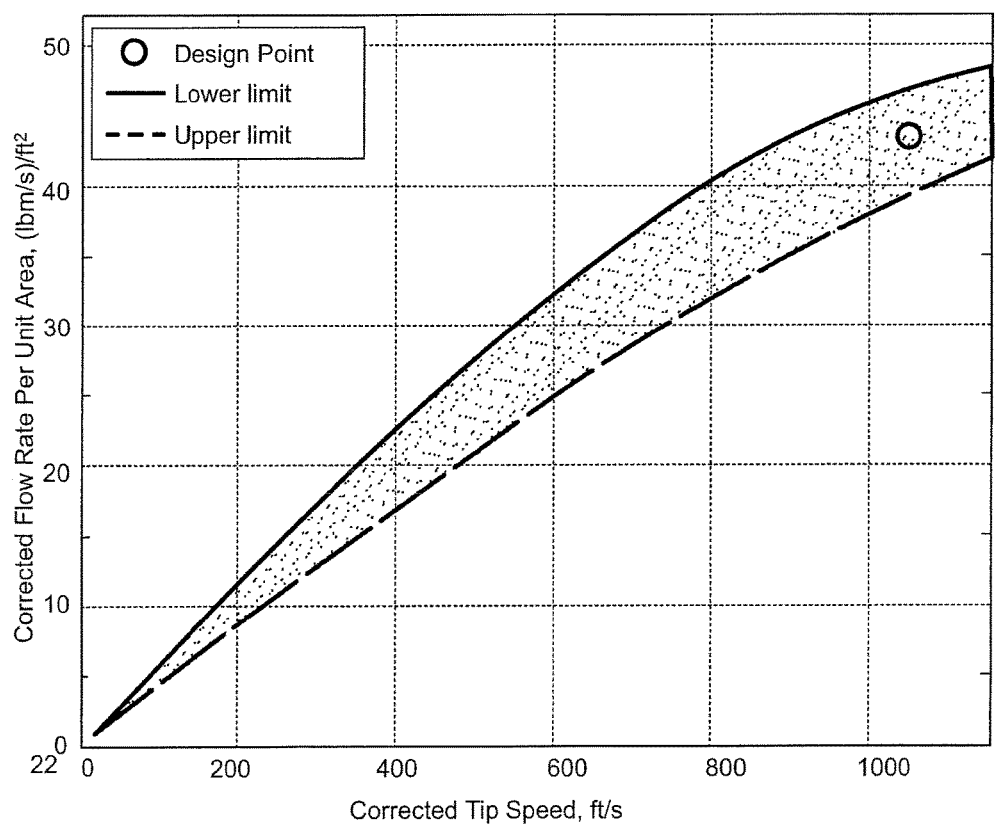
FIG. 5 illustrates exemplary values (shaded area) that satisfy the criterion $|\beta - \beta_{ADP}| \leq \delta$ degrees for a fan at an exemplary design point corrected tip speed and an exemplary design point corrected flow rate per unit area.

Thus, by knowing the aerodynamic design point and using this procedure, one can determine the corrected mass flow rate per unit area ($W_C/A$) that will satisfy the criterion $|\beta - \beta_{ADP}| \leq \delta$ at any corrected tip speed. For example, the shaded area in FIG. 5 satisfies the criterion $|\beta - \beta_{ADP}| \leq 4$ degrees for a fan 42 with design point corrected tip speed equal to 1050 feet per second and design point corrected flow rate per unit area equal to 43.5 pounds mass per second per square foot. In another embodiment 6 may be in the range of about zero (0) degrees to about six (6) degrees. In another embodiment, 6 may be in the range of about zero (0) degrees to about five (5) degrees. In another embodiment, 6 may be in the range of about zero (0) degrees to about four (4) degrees. In another embodiment, 6 may be in the range of about zero (0) degrees to about three (3) degrees. In one exemplary embodiment, the design point fan pressure ratio may not exceed about 1.45 and the design point corrected tip speed $U_{C,ADP}$ may not exceed about 1150 feet per second. In one embodiment, the absolute value of the difference between the design point fan tip leading edge relative flow angle $\beta_{ADP}$ and the off-design point fan tip leading edge relative flow angle $\beta$ is less than four (4) degrees at all acoustic operating points.

INDUSTRIAL APPLICABILITY

In general, the present disclosure may find applicability in reducing the fan noise produced on gas turbine engines by keeping the incidence angle within about six degrees or less of the incidence angle at the aero design point. This may be achieved by maintaining a specified relationship between the corrected mass flow per unit area ($W_C/A$) and the corrected fan tip speed ($U_C$).

What is claimed is:
1. A gas turbine engine comprising:
a fan including a plurality of blades each blade having a leading edge, the fan having a design point fan tip leading edge relative flow angle $\beta_{ADP}$, and further having an off-design point fan tip leading edge relative flow angle $\beta$ at an off-design fan operating point, the off-design fan operating point being an acoustic certification point, the acoustic certification point selected from the group consisting of approach, flyover and lateral as defined by Part 36 of the Federal Airworthiness Regulations;
a variable area fan nozzle configured to manipulate the amount of air flowing through the fan so that the absolute value of a difference between the design point fan tip leading edge relative flow angle $\beta_{ADP}$ and the off-design point fan tip leading edge relative flow angle $\beta$ is in the range of zero degrees to six degrees,
wherein the design point fan tip leading edge relative flow angle $\beta_{ADP}$ is defined by the solution to the following set of simultaneous equations

$$W_{C,ADP}/A = 85.38 M_{ADP}/(1 + 0.2 M_{ADP}^2)^3$$

and $$\beta_{ADP} = \tan^{-1}\left(\frac{49.02 M_{ADP}\sqrt{518.67/(1 + 0.2 M_{ADP}^2)}}{U_{C,ADP}}\right)$$

wherein further, the off-design point tip relative flow angle $\beta$ is defined by the solution to the following set of simultaneous equations $$W_C/A = 85.38 M/(1 + 0.2 M^2)^3$$

and $$\beta = \tan^{-1}\left(\frac{49.02\sqrt{518.67/(1 + 0.2 M^2)}}{U_C}\right)$$

wherein ($W_{C,ADP}/A$) is design point corrected mass flow rate per unit area in pounds mass per second per square foot, ($U_{C,ADP}$) is design point corrected tip speed in feet per second, $M_{ADP}$ is design point airflow Mach number, and $\beta_{ADP}$ is in degrees, ($W_C/A$) is corrected mass flow rate per unit area in pounds mass per second per square foot, $U_C$ is corrected tip speed in feet per second, M is airflow Mach number, and β is in degrees.

2. The gas turbine of claim 1, wherein the absolute value of the difference between the design point fan tip leading edge relative flow angle $β_{ADP}$ and the off-design point fan tip leading edge relative flow angle β is in the range of zero degrees to five degrees.

3. The gas turbine of claim 1, wherein the absolute value of the difference between the design point fan tip leading edge relative flow angle $β_{ADP}$ and the off-design point fan tip leading edge relative flow angle β is in the range of zero degrees to four degrees.

4. The gas turbine of claim 1, wherein the absolute value of the difference between the design point fan tip leading edge relative flow angle $β_{ADP}$ and the off-design point fan tip leading edge relative flow angle β is in the range of zero degrees to three degrees.

5. The gas turbine of claim 1, wherein a design point fan pressure ratio does not exceed 1.45 and the design point corrected tip speed ($U_{C,ADP}$) does not exceed 1150 feet per second.

6. The gas turbine of claim 5, wherein the absolute value of the difference between the design point fan tip leading edge relative flow angle $β_{ADP}$ and the off-design point fan tip leading edge relative flow angle β is in the range of zero degrees to five degrees.

7. The gas turbine of claim 5, wherein the absolute value of the difference between the design point fan tip leading edge relative flow angle $β_{ADP}$ and the off-design point fan tip leading edge relative flow angle β is in the range of zero degrees to four degrees.

8. The gas turbine of claim 5, wherein the absolute value of the difference between the design point fan tip leading edge relative flow angle $β_{ADP}$ and the off-design point fan tip leading edge relative flow angle β is in the range of zero degrees to three degrees.

9. The gas turbine of claim 5, wherein the gas turbine is a geared turbofan engine.

10. The gas turbine of claim 9, wherein the absolute value of the difference between the design point fan tip leading edge relative flow angle $β_{ADP}$ and the off-design point fan tip leading edge relative flow angle β is in the range of zero degrees to five degrees.

11. The gas turbine of claim 9, wherein the absolute value of the difference between the design point fan tip leading edge relative flow angle $β_{ADP}$ and the off-design point fan tip leading edge relative flow angle β is in the range of zero degrees to four degrees.

12. The gas turbine of claim 9, wherein the absolute value of the difference between the design point fan tip leading edge relative flow angle $β_{ADP}$ and the off-design point fan tip leading edge relative flow angle β is in the range of zero degrees to three degrees.

13. A method of using a gas turbine propulsion system, the method comprising:
operating a gas turbine engine including a fan and a variable area fan nozzle, the fan including a plurality of blades each having a leading edge, the fan configured to have a design point fan tip leading edge relative flow angle $β_{ADP}$, and further configured to have an off-design point fan tip leading edge relative flow angle β at an off-design fan operating point, the off-design fan operating point being an acoustic certification point, the acoustic certification point selected from the group consisting of approach, flyover and lateral as defined by Part 36 of the Federal Airworthiness Regulations;

using the variable area fan nozzle to manipulate the amount of air flowing through the fan so that the absolute value of a difference between the design point fan tip leading edge relative flow angle $β_{ADP}$ and the off-design point fan tip leading edge relative flow angle β is in the range of zero degrees to six degrees, wherein the design point fan tip leading edge relative flow angle $β_{ADP}$ is defined by the solution to the following set of simultaneous equations $$W_{C,ADP}/A = 85.38 M_{ADP}/(1 + 0.2 M_{ADP}^2)^3$$

and $$β_{ADP} = \tan^{-1}\left(\frac{49.02 M_{ADP}\sqrt{518.67/(1 + 0.2 M_{ADP}^2)}}{U_{C,ADP}}\right)$$

wherein further the off-design point tip relative flow angle β is defined by the solution to the following set of simultaneous equations $$W_C/A = 85.38 M/(1 + 0.2 M^2)^3$$

and $$β = \tan^{-1}\left(\frac{49.02\sqrt{518.67/(1 + 0.2 M^2)}}{U_C}\right)$$

wherein ($W_{C,ADP}/A$) is design point corrected mass flow rate per unit area in pounds mass per second per square foot, ($U_{C,ADP}$) is design point corrected tip speed in feet per second, $M_{ADP}$ is design point airflow Mach number, and $β_{ADP}$ is in degrees, ($W_C/A$) is corrected mass flow rate per unit area in pounds mass per second per square foot, $U_C$ is corrected tip speed in feet per second, M is airflow Mach number, and β is in degrees.

14. The method of claim 13, wherein the absolute value of the difference between the design point fan tip leading edge relative flow angle $β_{ADP}$ and the off-design point fan tip leading edge relative flow angle β is in the range of zero degrees to five degrees.

15. The method of claim 14, wherein the absolute value of the difference between the design point fan tip leading edge relative flow angle $β_{ADP}$ and the off-design point fan tip leading edge relative flow angle β is in the range of zero degrees to four degrees.

16. The method of claim 14, wherein the absolute value of the difference between the design point fan tip leading edge relative flow angle $β_{ADP}$ and the off-design point fan tip leading edge relative flow angle β is in the range of zero degrees to three degrees.

17. A gas turbine engine comprising:
a fan including a plurality of blades each blade having a leading edge, the fan having a design point fan tip leading edge relative flow angle $β_{ADP}$, and further having an off-design point fan tip leading edge relative flow angle β at an off-design fan operating point, the off-design fan operating point being an acoustic certification point, the acoustic certification point selected from the group consisting of approach, flyover and lateral as defined by Part 36 of the Federal Airworthiness Regulations;
a variable area fan nozzle configured to manipulate the amount of air flowing through the fan so that the absolute value of a difference between the design point fan tip leading edge relative flow angle $\beta_{ADP}$ and the off-design point fan tip leading edge relative flow angle $\beta$ is less than five degrees, wherein the design point fan tip leading edge relative flow angle $\beta_{ADP}$ is defined by the solution to the following set of simultaneous equations $$W_{C,ADP}/A = 85.38 M_{ADP}/(1 + 0.2 M_{ADP}^2)^3$$

and $$\beta_{ADP} = \tan^{-1}\left(\frac{49.02 M_{ADP}\sqrt{518.67/(1 + 0.2 M_{ADP}^2)}}{U_{C,ADP}}\right)$$

wherein further, the off-design point tip relative flow angle $\beta$ is defined by the solution to the following set of simultaneous equations $$W_C/A = 85.38 M/(1 + 0.2 M^2)^3$$

and $$\beta = \tan^{-1}\left(\frac{49.02\sqrt{518.67/(1 + 0.2 M^2)}}{U_C}\right)$$

wherein ($W_{C,ADP}/A$) is design point corrected mass flow rate per unit area in pounds mass per second per square foot, ($U_{C,ADP}$) is design point corrected tip speed in feet per second, $M_{ADP}$ is design point airflow Mach number, and $\beta_{ADP}$ is in degrees, ($W_C/A$) is corrected mass flow rate per unit area in pounds mass per second per square foot, $U_C$ is corrected tip speed in feet per second, M is airflow Mach number, and $\beta$ is in degrees.

18. The gas turbine engine of claim 17, wherein the gas turbine engine is a geared turbofan engine.

19. The gas turbine engine of claim 17, wherein the absolute value of the difference between the design point fan tip leading edge relative flow angle $\beta_{ADP}$ and the off-design point fan tip leading edge relative flow angle $\beta$ is less than four degrees at all acoustic operating points.

20. The gas turbine engine of claim 17, wherein a design point fan pressure ratio does not exceed 1.45 and the design point corrected tip speed ($U_{C,ADP}$) does not exceed 1150 feet per second.

* * * * *